Patented Nov. 30, 1943

2,335,273

UNITED STATES PATENT OFFICE 2,335,273

3,3-DIHALOGENOXINDOLES

Josef Haller, Leverkusen-I. G. Werk, Germany, assignor to General Aniline & Film Corporation, a corporation of Delaware No Drawing. Application September 18, 1939, Serial No. 295,543. In Germany September 17, 1938

8 Claims. (Cl. 260—319)

This invention relates to the preparation of 3,3-dihalogenoxindoles and to the products which are obtainable thereby.

I have found that 3,3-dihalogenoxindoles can be obtained in a simple manner by treating with hydrogen halides, preferably hydrogen chloride, in the presence of chlorosulfonic acid the compounds of the following general formula

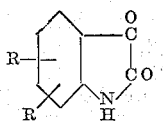

wherein the R's stand for a member of the group consisting of hydrogen, halogen, alkyl, and the nitro group. It was surprising that the oxygen atom in 3-position are replaced by halogen, whereas the reactive 2-position remains untouched. When it is started from compounds unsubstituted in 5- and/or 7-position the molecule is substituted besides by the sulfo-chloride group.

The reaction can be performed as follows: The starting material is dissolved in chlorosulfonic acid or a mixture consisting of chlorosulfonic acid and concentrated sulfuric acid and, for instance, gaseous hydrogen chloride is passed in the solution or a salt is added which develops hydrogen chloride with chlorosulfonic acid, concentrated sulfuric acid respectively. The temperature is maintained during the reaction at temperatures between about 0–60° C. When compounds are employed which are unsubstituted in 5- and/or 7-position an external addition of hydrogen chloride may be disregarded wholly or partly as the water which is liberated by the entering chlorosulfonic groups develops hydrogen chloride with the chlorosulfonic acid.

The products which are obtainable in accordance with our present invention are valuable intermediates, for instance for the manufacture of dyestuffs as they contain halogen atoms capable of reacting.

The following examples illustrate the invention without, however, restricting it thereto, the parts being by weight:

Example 1

100 parts of isatine are added in small portions to 500 parts of chlorosulfonic acid. The temperature increases at 55–60° C. and is maintained at 60° C. for 2–3 hours while adding gradually 30 parts of sodium chloride. The solution the color of which has brightened is stirred into ice-water. A colorless crystalline compound precipitates which is separated with suction after stirring for some time and washed with cold water. The yield amounts to 125 parts. The product dissolves very easily in ether and crystallizes from a 60 per cent acetic acid in nearly colorless compact prisms which melt at 169° C. The probable constitution is:

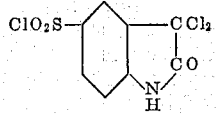

Example 2

80 parts of 5-bromoisatine are added at 10–20° C. to 400 parts of chlorosulfonic acid while stirring. Then the temperature is increased slowly and the whole heated for some hours at 60° C. Then the reaction mixture is poured onto ice and the colorless precipitate separated and washed with cold water. The compound crystallizes from benzene in colorless prisms which melt at 172° C. and corresponds probably to the following constitution:

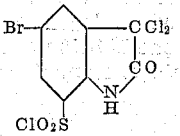

Example 3

Gaseous hydrogen chloride is passed into a solution of 100 parts of 5,7-dichloroisatine in 250 parts of sulfuric acid (66° Bé.) and 250 parts of chlorosulfonic acid at 55–60° C. while stirring, until the firstly deep orange-colored solution has brightened and a test portion poured onto ice yields a colorless precipitate which dissolves easily in ether. Then the whole is stirred into ice, separated with suction and washed with ice-water. The compound—β-dichloride of the 5,7-dichloroisatine—crystallizes from alcohol in colorless small leaves which melt at 196° C.

Example 4

30 parts of 6-chloro-7-methylisatine are added while stirring at 15–20° C. to 150 parts of chlorosulfonic acid. After one hour the temperature is gradually increased to 50° C. and maintained for 4 hours at this temperature. Then the reaction mixture is poured onto ice, filtered with suction, washed with cold water and dried. 43 parts of a nearly colorless compound is obtained which dissolves easily in ether and, when recrystallized from acetone, melts at 209° C. The reaction product is very probably the sulfochloride of the following constitution:

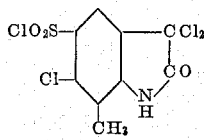

Example 5

17 parts of sodium chloride are added while stirring at 50–60° C. to a solution of 36 parts of 5-bromo-7-nitroisatine in 300 parts of chlorosulfonic acid within one hour. The color of the solution brightens strongly and a test portion when poured onto ice yields a colorless precipitate. The product separated in usual manner represents a colorless crystal powder which dissolves easily in ether and crystallizes from glacial acetic acid in colorless prisms which melt at 168° C. The reaction product is the β-dichloride of the 5-bromo-7-nitroisatine.

Example 6

8 parts of potassium bromide are added in small portions at 60° C. while stirring to a solution of 15 parts of 5,7-dibromoisatine in 75 parts of chlorosulfonic acid within 2½ hours. The solution grows pale. After pouring onto ice the product is filtered with suction, washed with cold water and dried. The product crystallizes from glacial acetic acid in colorless prisms which melt at 210° C. and represents very probably the β-dibromide of the 5,7-dibromoisatine.

I claim:

1. 3,3-dihalogenoxindoles, of the following general formula

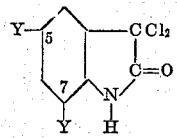

wherein Y is selected from the class consisting of hydrogen, alkyl, halogen, nitro- and sulfochloride, at least one Y being sulfochloride.

2. The 3,3-dihalogenoxindole of the formula

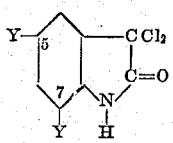

wherein one Y is sulfochloride and the other Y is hydrogen.

3. Process for the manufacture of 3.3-dihalogenoxindoles which comprises treating with hydrogen halide and chlorosulfonic acid a compound of the isatine series and of the formula

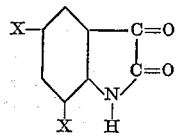

wherein X is selected from the class consisting of hydrogen, alkyl, halogen and nitro, at least one X being hydrogen.

4. Process for the manufacture of 3.3-dihalogenoxindoles which comprises treating with hydrogen chloride and chlorosulfonic acid a compound of the isatine series and of the formula

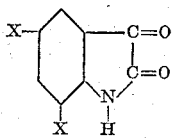

wherein X is selected from the class consisting of hydrogen, alkyl, halogen and nitro, at least one X being hydrogen.

5. A process as in claim 3 in which the compound of the isatine series is isatine.

6. A process as in claim 3 in which the compound of the isatine series is 5-bromo-isatine.

7. A compound having the formula

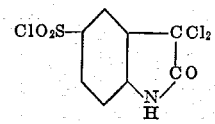

8. The compound having the formula

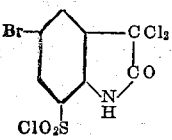

JOSEF HALLER.